L. A. OSGOOD.
THERMOSTAT FOR PORTABLE SCALES.
APPLICATION FILED DEC. 8, 1920.

1,421,825.

Patented July 4, 1922.

INVENTOR
Louis Ashley Osgood
BY
Kerr Page Cooper & Hayward
ATTORNEYS

United States Patent OFFICE.

LOUIS A. OSGOOD, OF DAYTON, OHIO, ASSIGNOR TO INTERNATIONAL SCALE COMPANY, OF DAYTON, OHIO, A CORPORATION OF ILLINOIS.

THERMOSTAT FOR PORTABLE SCALES.

1,421,825.  Specification of Letters Patent.  Patented July 4, 1922.

Application filed December 8, 1920. Serial No. 429,052.

*To all whom it may concern:*

Be it known that I, LOUIS A. OSGOOD, a citizen of the United States, residing at Dayton, in the county of Montgomery and State of Ohio, have invented certain new and useful Improvements in Thermostats for Portable Scales, of which the following is a full, clear, and exact description.

The present invention relates to improvements in thermostatically controlled means for compensating for the temperature variations in the load counterbalancing spring of spring scales. In scales of this type the usual practise has been to provide a thermostat element associated with the base lever system. In certain instances the user purchases the overhead lever system or head separately from the base system, and it is one of the objects of the present invention to provide a thermostat device that may be readily embodied in the overhead system. The use of a thermostat at this location necessitates a compact arrangement of parts in order that the size of the housing be not unduly extended. The present invention provides a particularly compact arrangement of parts which may readily be arranged in casings now in use.

The thermostatic devices are also of such character that they are simple and inexpensive to manufacture and assemble and not likely to become disarranged when the scale is in use.

Figure 1:
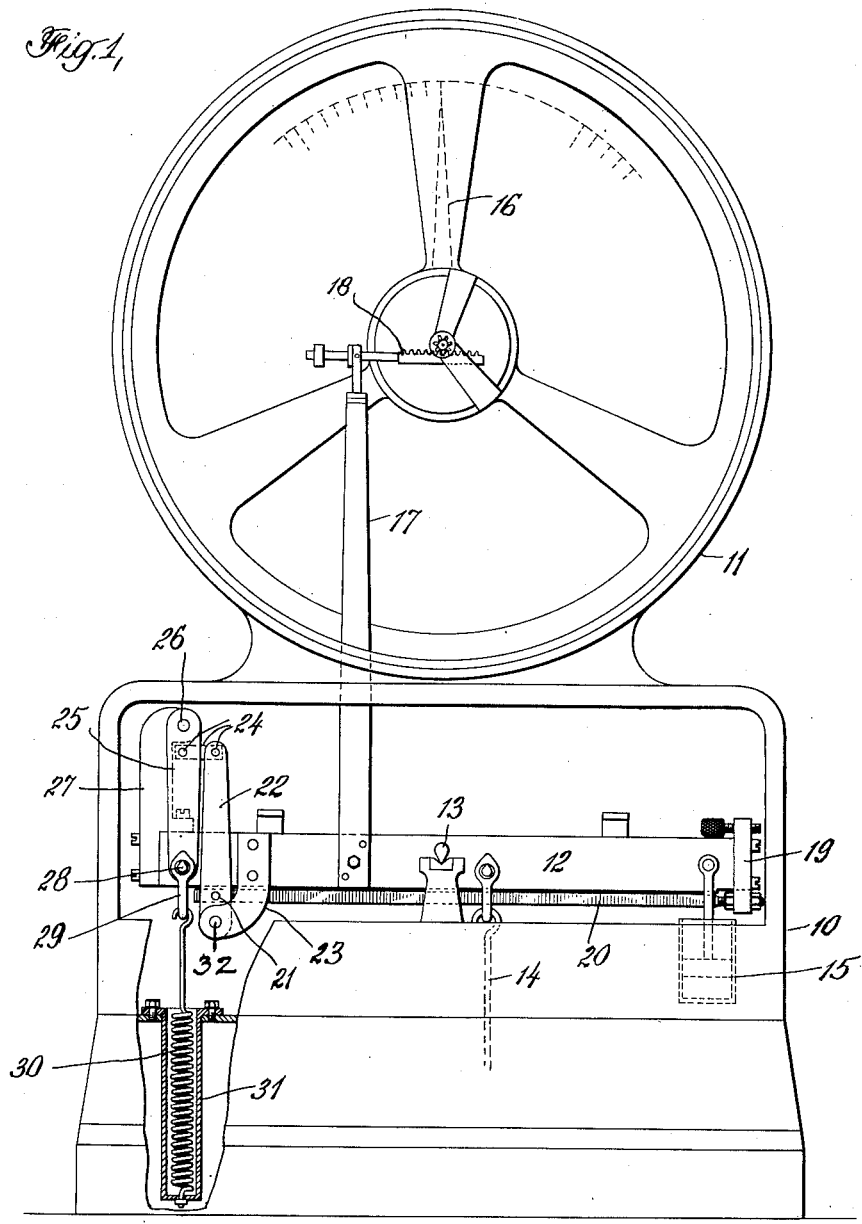

Fig. 1 of the drawing shows a rear view of a scale embodying my improved thermostat.

Figure 2:
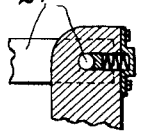

Fig. 2 shows a spring joint take-up device.

The scale comprises a housing 10 surmounted by a dial housing 11. Within the housing 10 is a scale beam 12 which is suitably fulcrumed by means of a knife-edge bearing 13. A steelyard 14 connects with the base lever system (not shown). A dashpot 15 is provided to check the oscillations.

The connections to the indicator 16 may be of any desired form. I have here shown an upstanding arm 17 provided with a connecting rack 18 meshing with a pinion upon the indicator shaft.

Fastened to the right-hand end of the beam 12 is a bracket 19 to which is adjustably secured a thermostatic rod 20 which extends lengthwise under the beam and connects through pin 21, with a swinging arm 22. This arm is mounted to swing about a pin 32 carried by a bracket 23 which in turn depends from and is supported by the scale beam. The upper end of the arm 22 is provided with a link and pin connection 24 connecting with a second swinging arm 25. This arm 25 is mounted upon a pin 26 carried by a bracket 27 fixed to and extending upwardly from the scale beam. The free lower end of arm 25 is provided with knife-edges 28 which through a loop 29 connect with the counterbalancing spring 30.

The spring 30 is surrounded by and connected at its lower end to a tubular socket 31. This socket is suitably attached to the frame of the scale and is made of a metal having a high coefficient of expansion.

In spring scales, the counterbalancing springs produce two independent errors when they are subjected to changes in temperature. The zero balance of the scale is varied by changes in the overall length of the spring caused by temperature variations. Such changes in spring length are compensated for in my scale by the thermostatic socket 31. Changes in running or load balance occur through the change in the coefficient of flexibility or expansion of the spring under varying temperatures. Thermostatic member 20 and the swinging arms 22 and 25 compensate for these errors by changing the effective lever arm acting upon the spring. The swinging arms form an exceedingly compact and rugged multiplying connection between the thermostatic element and the spring pivots and materially increase the degree of movement imparted by the variable expansion of the thermostatic element under variable temperature. Moreover, these devices, once properly adjusted, retain their adjustment under rigid service conditions.

In order to prevent errors arising from lost motion at the joints 21, 24, 26, etc., it is desirable to provide a spring take-up such as is shown in Fig. 2. This device is of any desired form, and the spring tension should be such that the joints are maintained in predetermined position relatively to the shiftable parts, irrespective of the applied force or the direction of movement of parts.

What I claim is:—

1. In a weighing scale in combination a scale lever, a pair of brackets carried thereby, a pair of connected swinging arms mounted to swing thereon, a thermostat connected to one of said arms and to said lever, a load counterbalancing spring, and a connection between the other of said arms and said spring, for the purpose described.

2. In a weighing scale, a lever, a longitudinally extending thermostatic element connected to said lever adjacent one end thereof, a bracket extending upwardly from the lever at the other end, a bracket depending from the lever at the same end, a swinging arm depending from the first-mentioned bracket, a swinging arm extending upwardly from the other bracket, an operating connection between the said arms, a load-resisting spring connected to one of the arms, and a connection between the other arm and the thermostatic element, for the purpose described.

3. In a scale comprising a fulcrumed lever, a load counterbalancing spring and indicating means connected with the lever, of a thermostatic element carried by the lever, and multiplying connections between the thermostatic element and the said spring, said connections comprising a pair of interconnected swinging arms mounted upon and swinging relatively to the lever one of said arms carrying a pivot to which the counterbalancing spring is connected.

4. The invention set forth in claim 3 in which a thermostatic support is provided for the spring to compensate for variations in length thereof due to changes in temperature.

5. In a scale in combination a fulcrumed lever, an indicating means connected thereto, a load counterbalancing spring connected with said lever, and a thermostatic support for said spring comprising a tubular socket fixed at its end and into which the spring extends and is connected.

6. In a scale in combination, a fulcrumed lever, indicating means connected thereto, a load counterbalancing spring, a thermostatic controlled connection between the lever and the spring to maintain proper load balance by varying the effective lever arm between the lever and the spring, a tubular socket of material having a high coefficient of expansion, said socket being fixed at one end and having its opposite end connected to the spring to compensate for elongations and contractions of the spring under temperature changes.

In testimony whereof I hereto affix my signature.

LOUIS A. OSGOOD.